(12) United States Patent
Savoy et al.

(10) Patent No.: US 8,550,951 B2
(45) Date of Patent: Oct. 8, 2013

(54) DIFFERENTIAL

(75) Inventors: Juliano Savoy, Jundiaí (BR); Mauro Moraes De Souza, Jundiaí (BR); Philippe Duque, Jundiaí (BR); Matthias Derse, Elzach (DE); Eva-Maria Finkenzeller, Gengenbach (DE); Renald Kuempel, Steinach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 390 days.

(21) Appl. No.: 12/761,663

(22) Filed: Apr. 16, 2010

(65) Prior Publication Data

US 2010/0267511 A1 Oct. 21, 2010

Related U.S. Application Data

(60) Provisional application No. 61/181,090, filed on May 26, 2009.

(30) Foreign Application Priority Data

Apr. 17, 2009 (DE) .......................... 10 2009 017 889

(51) Int. Cl.
*F16H 48/06* (2006.01)
(52) U.S. Cl.
USPC .................. 475/230; 74/665 GA; 74/665 GB (58) Field of Classification Search
USPC ................ 475/230, 248; 74/665 GA, 665 GB
See application file for complete search history.

(56) References Cited

U.S. PATENT DOCUMENTS

| 2,408,926 | A | * | 10/1946 | Griffith | 475/245 |
| 6,743,138 | B2 | * | 6/2004 | Krzesicki et al. | 475/230 |
| 2005/0221944 | A1 | * | 10/2005 | Shirato et al. | 475/230 |
| 2006/0270511 | A1 | * | 11/2006 | Hsieh et al. | 475/230 |
| 2007/0167272 | A1 | * | 7/2007 | Higano et al. | 475/248 |
| 2009/0270218 | A1 | * | 10/2009 | Krude et al. | 475/230 |
| 2010/0062892 | A1 |   | 3/2010 | Vogel et al. | |

FOREIGN PATENT DOCUMENTS

DE 4136955 A1 * 5/1993
WO WO 2008/122276 A2 10/2008

* cited by examiner

*Primary Examiner* — Justin Holmes
(74) *Attorney, Agent, or Firm* — Crowell & Moring LLP (57) ABSTRACT

A differential comprising at least one drive wheel, at least two axle wheels, at least one compensating wheel and at least one connecting element, wherein the connecting element experiences at least a first torque at least from the drive wheel, and wherein the connecting element transmits at least a second torque to at least one of the at least two axle wheels. The drive wheel is constructed such that the drive wheel at least partially surrounds at least one inner chamber; the connecting element is arranged at least partially inside the inner chamber that is at least partially surrounded by the drive wheel, and the connecting element is constructed in one piece.

3 Claims, 6 Drawing Sheets

DIFFERENTIAL

CROSS REFERENCE TO RELATED APPLICATIONS

This application claims priority from co-pending U.S. provisional patent application No. 61/181,090, filed May 26, 2009. Priority is also claimed based on Federal Republic of Germany patent application no. DE 10 2009 017 889.9, filed Apr. 17, 2009. The entire disclosure of both priority applications is incorporated herein by reference.

BACKGROUND OF THE INVENTION

The present invention relates to a differential comprising at least one drive wheel, at least two axle wheels, at least one compensating wheel and at least one connecting element, wherein the connecting element experiences at least a first torque at least from the drive wheel, and wherein the connecting element transmits at least a second torque to at least one of the at least two axle wheels by means of the at least one compensating wheel.

A differential gear, also called a differential for short, is a special planetary gear which, e.g., when a vehicle is driven in a curve, provides counterbalance for the different length paths traversed by the two wheels of an axle since the wheels rotate at different speeds. To this end, a connecting element is subjected to a drive torque from a drive wheel and is thereby put into motion. The drive wheel itself is in turn connected to a step-up gear and to an actual automotive engine via this step-up gear. Two axle wheels, each of which transmits a torque to an axle section connected to a wheel, are arranged in this connecting element, wherein the transmitted torque is dependent on the applied drive torque. The compensating wheel is connected to the axle wheels in a torque-related manner. When a difference in speed appears between the two wheels, the compensating wheel rotates and causes one axle to rotate at a higher speed.

In the prior art, the connecting element is generally a differential cage within which the axle wheels and the compensating wheels are arranged and whose circumference is connected to the drive wheel.

One embodiment of such a differential is found, for example, in published international patent application no. WO 2008/122276.

Disadvantages in the embodiments of the prior art arise from the differential cage in particular, which is expensive to manufacture, leads to a high space requirement and has a high weight.

SUMMARY OF THE INVENTION

It is therefore an object of the invention to provide an improved differential.

Another object of the invention is to provide a differential that avoids or overcomes the disadvantages of prior art differentials;

A further object of the invention is to provide a differential that has a decreased weight and space requirement compared to prior art differentials.

These and other objects have been achieved in accordance with the present invention by providing a differential in which the drive wheel is constructed such that the drive wheel at least partially surrounds at least one inner chamber; the connecting element is arranged at least partially inside the inner chamber that is at least partially surrounded by the drive wheel, and the connecting element is constructed in one piece.

In the prior art, the connecting element comprises at least one differential cage which is laterally fastened to the circumference of the drive wheel. In the present invention, however, the connecting element is installed in the drive wheel itself and is at least partially surrounded to some extent by the drive wheel.

In addition, the drive wheel has at least one free interior area. For example, the drive wheel essentially comprises a gearwheel whose body or flange surface is not filled, i.e., it is free.

The compact construction of the differential according to the invention also facilitates easy mounting of the differential. The differential according to the invention also advantageously reduces manufacturing costs.

The differential according to the invention furthermore offers the advantages of oil tightness, i.e., the differential can already be filled with oil before the actual (final) assembly. This is in contrast to prior art differentials in which oil filling can occur only after assembly. In addition, the differential according to the invention does not lose any oil when the side shafts are disassembled.

The one-piece construction of the connecting element, e.g., as a forged or sintered part, provides higher stability and resistance vis-à-vis the forces and moments that occur, e.g., notch stresses as they would occur in multi-piece connecting elements. The one-piece connecting element embodiment may be constructed, for example, using side extrusion presses.

The axle wheels can, for example, be axle bevel wheels, but other types of gearwheels are also possible. The compensating wheels are constructed to correspond to the axle wheels. If the axle wheels are bevel wheels, for example, then the compensating wheels are preferably compensating bevel wheels.

According to one advantageous preferred embodiment of the invention the connecting element has at least two axle-wheel journals around each of which one of the at least two axle wheels is rotatably arranged, and the at least two axle-wheel journals are arranged along a first imaginary axis of the connecting element. The two axle wheels thus each rotate around journals, which lie on a first imaginary axis of the differential according to the invention. The two journals preferably lie on the first imaginary axis such that they face away from one another. In the installed state of the differential, this first imaginary axis generally runs parallel to the longitudinal vehicle axis.

In accordance with another preferred embodiment of the invention the connecting element has at least one compensating-wheel journal around which the at least one compensating wheel is rotatably arranged; the compensating-wheel journal is arranged along a second imaginary axis of the connecting element, and the second imaginary axis of the connecting element is essentially perpendicular to the first imaginary axis of the connecting element. The compensating wheel is likewise rotatably arranged on a journal such that the compensating wheel rotates around a second imaginary axis that is perpendicular to the first imaginary axis.

According to yet another preferred embodiment of the invention at least two compensating wheels are provided; the connecting element has at least two compensating-wheel journals around each of which one of the at least two compensating wheels is rotatably arranged, and the at least two compensating-wheel journals are arranged along the second imaginary axis of the connecting element. This embodiment thus provides for two compensating wheels with associated journals. In this connection, the two journals are preferably likewise aligned on the second imaginary axis facing away from each other.

In another preferred embodiment of the invention the drive wheel essentially rotates within an imaginary plane, and the first imaginary axis runs essentially in the direction of the normal to the imaginary plane within which the drive wheel rotates.

Another preferred embodiment provides that the second imaginary axis of the connecting element lies essentially inside the imaginary plane within which the drive wheel rotates.

Yet another preferred embodiment of the invention provides that the second imaginary axis of the connecting element essentially lies inside a plane that extends essentially parallel to the imaginary plane within which the drive wheel rotates. The drive wheel thus rotates inside an imaginary plane, and the first imaginary axis runs perpendicular to this plane.

In one preferred embodiment, the two axle wheels and the drive wheel rotate around the same axis.

In another preferred embodiment, the second imaginary axis runs within the plane in which the drive wheel rotates.

In yet another preferred embodiment, the second imaginary axis is displaced parallel to it, i.e., the connecting element is either centrally located in the empty flange surface of the drive wheel or is laterally displaced in relation to it.

The second imaginary axis in one embodiment coincides in particular with a chord of an essentially disk-shaped drive wheel, which cord runs through the center of a circular plane of the drive wheel.

One embodiment of the invention envisions that the connecting element has at least one central area from which the at least two axle-wheel journals and the at least one compensating-wheel journal extend like points of a star.

One embodiment of the invention provides that the central area of the connecting element is arranged essentially symmetrical around the center of gravity of the drive wheel. Thus a uniform distribution of mass is achieved.

One embodiment of the invention envisions that the at least one compensating-wheel journal is directly or indirectly at least partially coupled to an interior surface of the drive wheel. The connecting element is connected to the drive wheel by the connection and thereby experiences a first torque, i.e., the connecting element rotates along with the drive wheel because of the rotation of the drive wheel. This coupling, however, can not only be realized by fastening of the compensating-wheel journals, but also by other connections between the connecting element and the drive wheel.

One embodiment of the invention envisions that at least one surface of the at least one compensating-wheel journal facing away from the central area of the connecting element is at least partially connected to the interior surface of the drive wheel.

In one embodiment of the invention the drive wheel is essentially constructed like a gearwheel. The gearwheel preferably has a sufficiently large, free inner chamber to accommodate the connecting element. The drive wheel is preferably constructed like a gear ring.

One embodiment of the invention envisions that the drive wheel may have a straight external tooth system or a slanted external tooth system or a hypoidal external tooth system.

One embodiment of the invention comprises that at least one slide cup is arranged between the at least two axle-wheel journals and the axle wheel attached to the respective axle-wheel journal. The slide cup serves to absorb forces and also, for example, keeps the axle wheel and compensating wheel from becoming jammed together.

One embodiment of the invention envisions that at least one slide bearing bush is arranged between the at least one compensating-wheel journal and the compensating wheel attached to the at least one compensating-wheel journal. The slide bearing bush likewise serves to take up forces or moments that could negatively affect the bevel wheels. If two compensating wheels are provided, then at least one slide bearing bush is preferably provided between each compensating wheel and compensating-wheel journal.

One embodiment of the invention comprises that at least one backing piece is arranged along the at least one compensating-wheel journal at least on the side of the compensating wheel facing away from the central area. The backing piece serves to axially support the compensating wheels and thus provides for engagement of the associated bevel wheels with one another. Furthermore, the tooth play between the bevel wheels is thereby adjusted.

One embodiment of the invention envisions that at least one stop disk or spacer disk is arranged on the at least one compensating-wheel journal between the side of the compensating wheel facing away from the central area and the at least one backing piece. The stop disk provides for favorable sliding movement between the compensating wheel and the backing piece positioned behind it on the same journal.

In one embodiment of the invention at least one of the at least two axle wheels has an outer profile or an inner profile for connecting to a shaft and/or a wheel. For example, an external tooth system or an internal tooth system may be provided for making the connection.

One embodiment of the invention envisions providing at least one housing which surrounds at least the connecting element and at least a portion of the drive wheel.

One embodiment of the invention envisions that the housing has at least one passage through which a torque is transmitted to the drive wheel.

One embodiment of the invention provides that at least one tapered roller bearing is provided. The roller bearings absorb axial forces and serve to guide the axle wheels.

One embodiment provides that the at least one antifriction roller bearing is provided. The antifriction roller bearing may be constructed, for example, as a ball bearing. The antifriction roller bearing, furthermore, is located for example between the axle wheels and their respective axle-wheel journals.

BRIEF DESCRIPTION OF THE DRAWINGS

The invention will be described in further detail hereinafter with reference to illustrative embodiments shown in the accompanying drawing figures, in which.

DETAILED DESCRIPTION OF EMBODIMENTS

In the following explanations, bevel wheels are referred to as an example. However, it should be understood that other types of wheels could be used.

Figure 1:
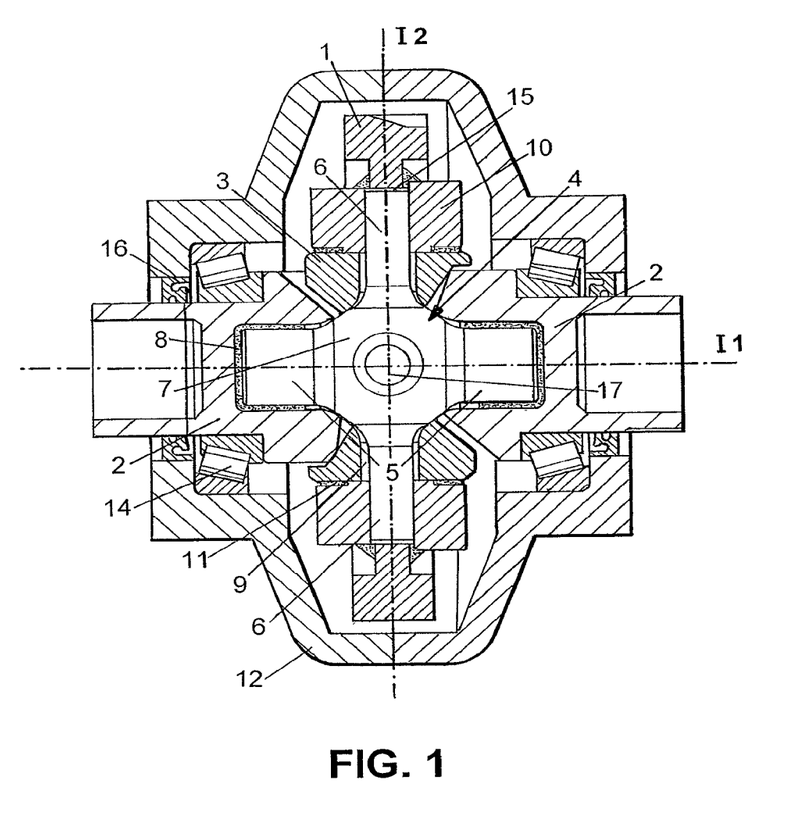
FIG. 1 is a cross section through a first embodiment of the differential according to the invention.
Figure 2:
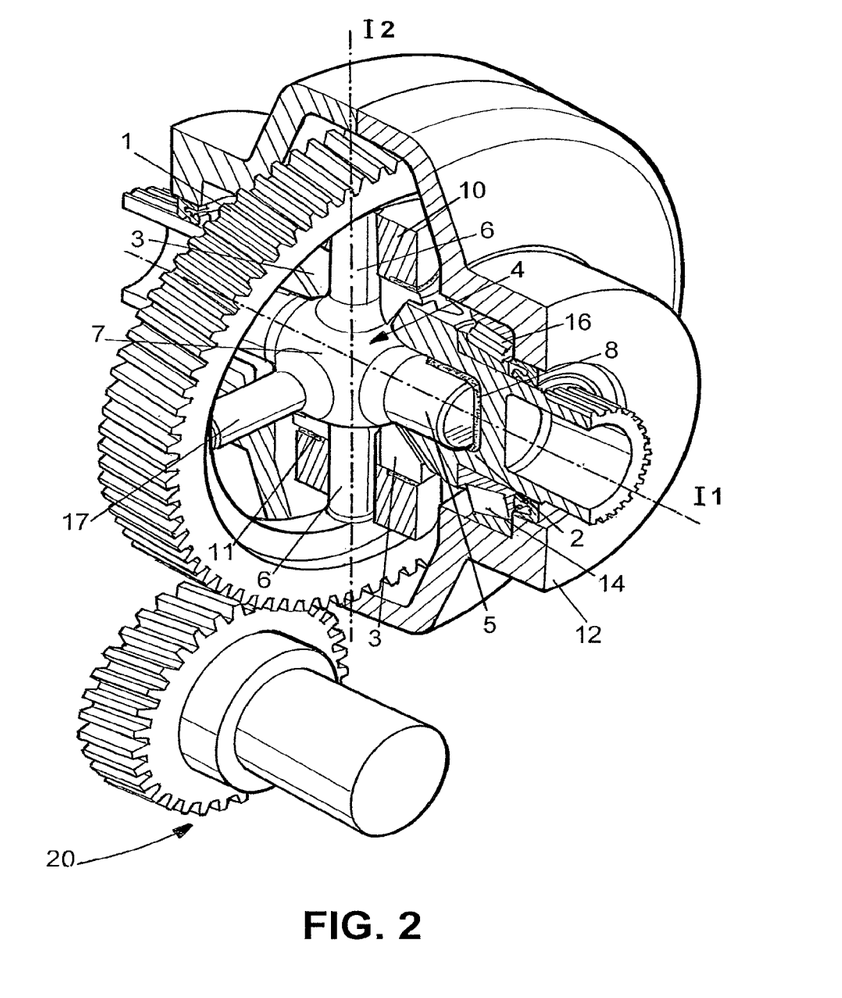
FIG. 2 is a cutaway perspective view of the embodiment of FIG. 1.

The cross section of FIG. 1 and the associated perspective view of FIG. 2 illustrate a first embodiment of the differential according to the invention. The connecting element 4, which in the prior art has been constructed as a differential cage, is arranged essentially centrally in the housing 12. In this embodiment, it has the form of an essentially massive central region 7 from which a total of six journals extend (see the associated FIG. 2). These journals are two axle-wheel journals 5, two compensating-wheel journals 6 and two mounting journals or pins 17. The journals 5, 6, 17 each have an essentially cylindrical construction, whereby in the illustrated embodiment the axle-wheel journals 5 have a larger diameter than that of the two other journal types 6, 17.

The two compensating-wheel journals 6 and the two fastening journals 17 connect the connecting element 4, which is thus star-shaped in this embodiment and which in the functional context can also be called a planetary carrier, to the drive wheel 1. The drive wheel 1 is a gearwheel or a gear ring, i.e., teeth are located on the outside, and the interior area or flange area of drive wheel 1 is empty or free of material in such a manner that there exists adequate space for the remaining components of the differential according to the invention. In this case in particular, drive wheel 1 has a slanted external tooth system.

As can be seen from FIG. 2, the drive 20 drives the drive wheel 1 to rotate around the first imaginary axis I1, i.e., the drive wheel 1 receives a first torque. The drive 20 is connected directly to the engine (not shown) of the vehicle in which the differential is installed. The drive wheel 1 itself transmits a second torque, which is dependent on the first torque, to the laterally attached wheels (not shown) via the rotation of the axle wheels 2, each of which rotates around its associated axle-wheel journal 5. External tooth systems are attached to the axle wheels 2 for the connection of the differential in the vehicle axis. In this embodiment, the axle wheels 2 are thus shaped like bevel gears, wherein an essentially cylindrical unit, which has the external tooth system in this case, is attached to the base of each bevel gear. Each of the axle wheels 2 is rotatably arranged on a respective axle-wheel journal 5 via a slide cup 8 (see FIG. 1 and FIG. 2) whose sliding surface is arranged outwardly, i.e., in the direction of the axle wheels 2. Furthermore, two tapered roller bearings 14, which provide for axial support along the first imaginary axis I1, are provided between each of the axle wheels 2 and the housing 12. In addition, a gearwheel shaft seal 16 seals the housing 12 laterally in the direction of the wheels. This makes it possible, among other things, to construct the differential according to the invention as an essentially completely closed unit. The passage for the connection to the drive must also be appropriately shaped for this purpose. This closed construction also allows the differential to be filled with oil before it is installed.

Two compensating-wheel journals 6 for two compensating wheels 3 are provided along the second imaginary axis I2, which is perpendicular to the first imaginary axis I1. The axle wheels 2 and the compensating wheels 3 are constructed and arranged relative to one another such that they engage one another via their teeth. The normal functional principle of a differential is therefore carried out by the compensating wheels 3. The connecting element 4 transmits the second torque to the axle wheels 2 via the two compensating wheels 3. The compensating wheels 3 are rotatably arranged around the compensating-wheel journals 6 via slide bearing bushes 9. The compensating-wheel journals 6, in turn, are each connected to the drive wheel 1 via a respective attachment region 15, optionally by welding, and therefore rotate with it. A backing piece 10, which provides axial support for the compensating wheels 3 and thus prevents them from moving radially outwards, is in turn provided in the direction of each interior surface of drive wheel 1. The difference in height of the backing pieces 10, which is particularly visible in FIG. 1, serves for assembly on the one hand and for lateral support of the backing pieces 10 on the other hand. Between each of the backing pieces 10 and their associated compensating wheels 3 stop disks 11 are provided, which facilitate the sliding between the respective compensating wheel 3 and backing piece 10.

An attachment journal 17, which serves to fix the connecting element 4 to the interior surface of the drive wheel 1, can be seen in FIG. 2.

The differential according to the invention thus differs from the state of the art at least in that the structure—here generally called the connecting unit—for transmitting the torque to the wheels of a vehicle axle and for reacting to a difference in rotational speed of the two wheels is arranged inside the drive wheel and is not attached to it laterally as in the prior art. This reduces the space requirement of the differential, and this construction also permits lower weight.

Figure 3:
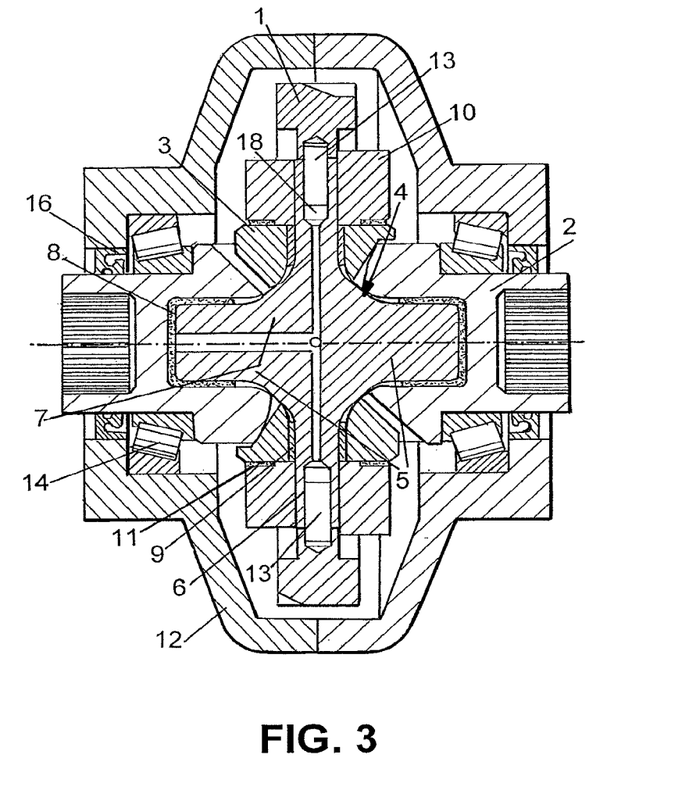
FIG. 3 is a cross-section through a second embodiment of the differential according to the invention.
Figure 4:
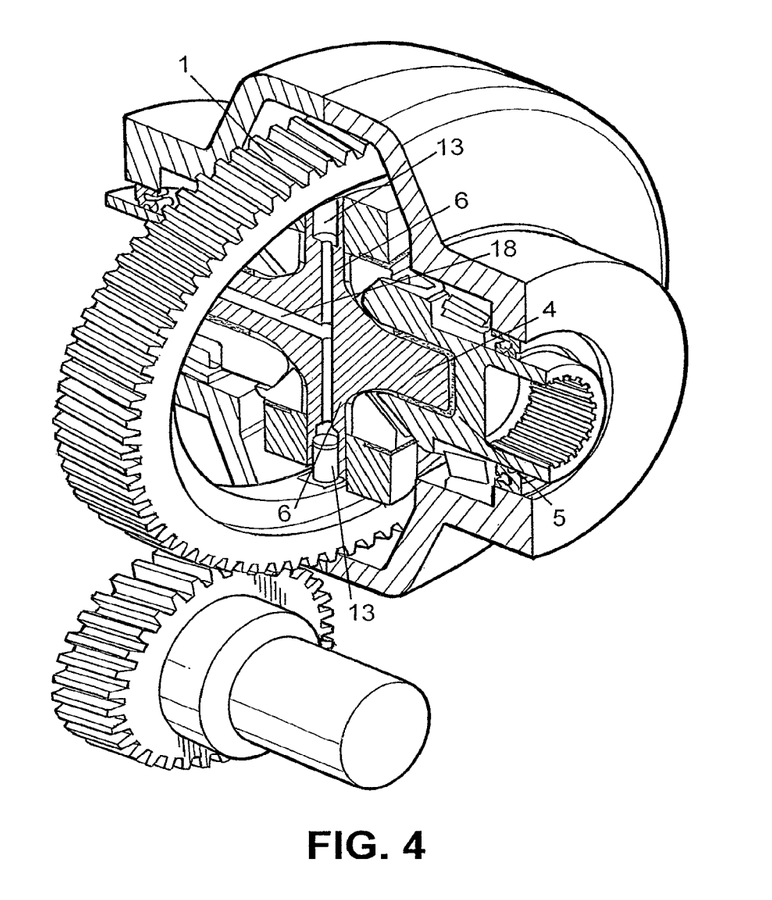
FIG. 4 is a cutaway perspective view of the embodiment of FIG. 3.

FIG. 3 depicts a cross section through a second embodiment of the differential according to the invention. FIG. 4 depicts a corresponding cutaway perspective view. An alternative embodiment for attaching the connecting element 4 to the drive wheel 1 can be seen here in particular. The connection is realized by locking pins 13, which partially extend into the compensating-wheel journals 6 or attachment journals 17, respectively, and partially extend into the recesses of drive wheel 1. A hydraulic channel 18, which opens into one of the axle-wheel journals 5, is provided to insert the pins 13 into the respective recesses of the drive wheel 1 after assembly, i.e., after the components have been placed onto the journals and inserted into the drive wheel 1. The hydraulic channel 18—or alternatively a pneumatic channel—leads in the direction of the respective journal, thereby accomplishing the attachment of the connecting element 4 to the drive wheel 1. The recess in the connecting element 4 into which the locking pin 13 is inserted is also particularly visible in the drive wheel 1 as shown in FIG. 4. An oil for example, which displaces the pins 13 outwards and thus into the recesses of drive wheel 1 when pressure is exerted, is introduced into this channel 18. But other possibilities also exist, e.g., the use of springs.

The embodiment of FIGS. 3 and 4 also differs from the first embodiment of FIGS. 1 and 2 discussed above in that the two axle-wheel journals 5 each have internal teeth for connecting to the side shafts leading to the wheels.

Figure 5:
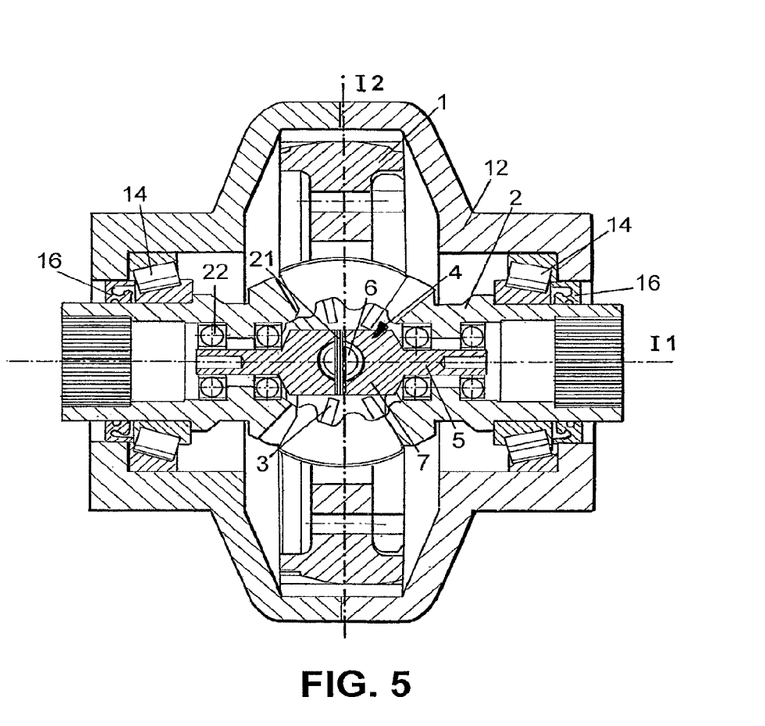
FIG. 5 is a cross-section through a third embodiment of the differential according to the invention.
Figure 6:
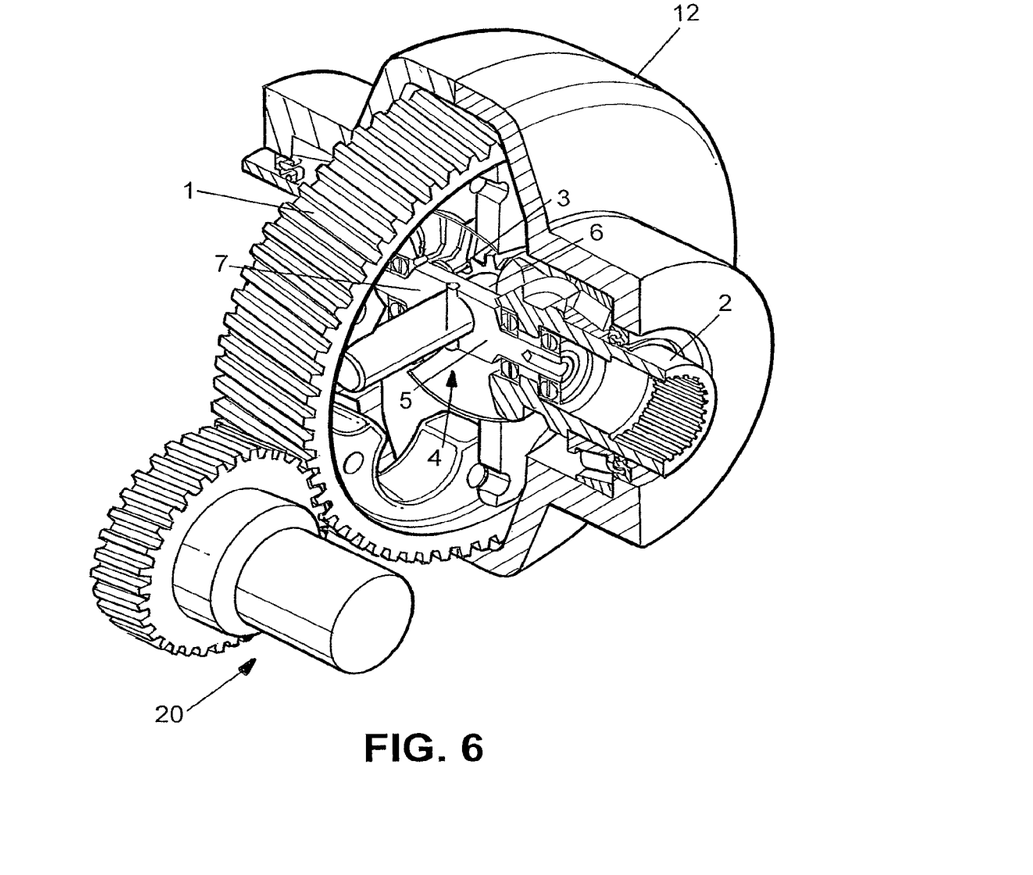
FIG. 6 is a cutaway perspective view of the embodiment of FIG. 5.

FIGS. 5 and 6 depict a cross section and a partially cutaway perspective view of a third embodiment of the differential according to the invention. In the representation of FIG. 6, the compensating wheel 3 is located behind the axle wheels 2.

While the connecting element 4 in the preceding embodiments is a one-piece component, for example a forged component, in the embodiment of FIGS. 5 and 6 the connecting element is constructed as two pieces. A mechanical coupling, such as screw connections 21 or mounting pins or the like, connects the two halves of connecting element 4 to one another.

Another difference is that the axle-wheel journals 5 are each surrounded by an antifriction bearing, such as a ball bearing 22, upon which the axle wheels 2 are arranged. The axle wheels 2, in turn, are axially secured in the axle-wheel journal 5 by a screw (not shown). Recesses for receiving the screws can be seen at the ends of the journals 5.

The foregoing description and examples have been set forth merely to illustrate the invention and are not intended to be limiting. Since modifications of the described embodi-

The invention claimed is:

1. A differential comprising at least one drive wheel, at least two axle wheels, at least one compensating wheel, and at least one connecting element, wherein:
   the drive wheel applies a first torque to the connecting element;
   the connecting element transmits at least a second torque to at least one of the axle wheels;
   the drive wheel is constructed such that the drive wheel at least partially surrounds at least one inner chamber;
   the connecting element is arranged at least partially inside the inner chamber that is at least partially surrounded by the drive wheel, the connecting element is constructed in one piece;
   the connecting element comprises at least two axle-wheel journals;
   a respective one of the at least two axle wheels is rotatably arranged around each of the axle-wheel journals;
   the at least two axle-wheel journals are arranged along a first imaginary axis of the connecting element;
   a second imaginary axis of the connecting element is essentially perpendicular to the first imaginary axis of the connecting element, the second imaginary axis lying inside an imaginary plane within which the drive wheel rotates with teeth of the drive wheel lying in the imaginary plane;
   at least two compensating wheels are provided;
   the connecting element comprises at least two compensating-wheel journals;
   a respective one of the at least two compensating wheels is rotatably arranged around each of the compensating-wheel journals;
   the at least two compensating-wheel journals are arranged along the second imaginary axis of the connecting element;
   the first imaginary axis runs essentially in the direction of the normal to the imaginary plane within which the drive wheel rotates;
   the differential further comprises a housing surrounding at least the connecting element and the drive wheel;
   each of the at least two axle wheels extends through a respective one of two passages of the housing and includes a blind hole configured to receive one of said at least two axle-wheel journals;
   each of the two passages of the housing is sealed by a respective one of two gearwheel shaft seals; and
   the differential is oil-tight.

2. A differential as claimed in claim 1, wherein at least one compensating-wheel journal is directly or indirectly at least partially connected to an interior surface of the drive wheel.

3. A differential as claimed in claim 2, wherein at least one surface of the at least one compensating-wheel journal facing away from the central area of the connecting element is at least partially connected to the interior surface of the drive wheel.

* * * * *